United States Patent Office 2,888,856
Patented June 2, 1959

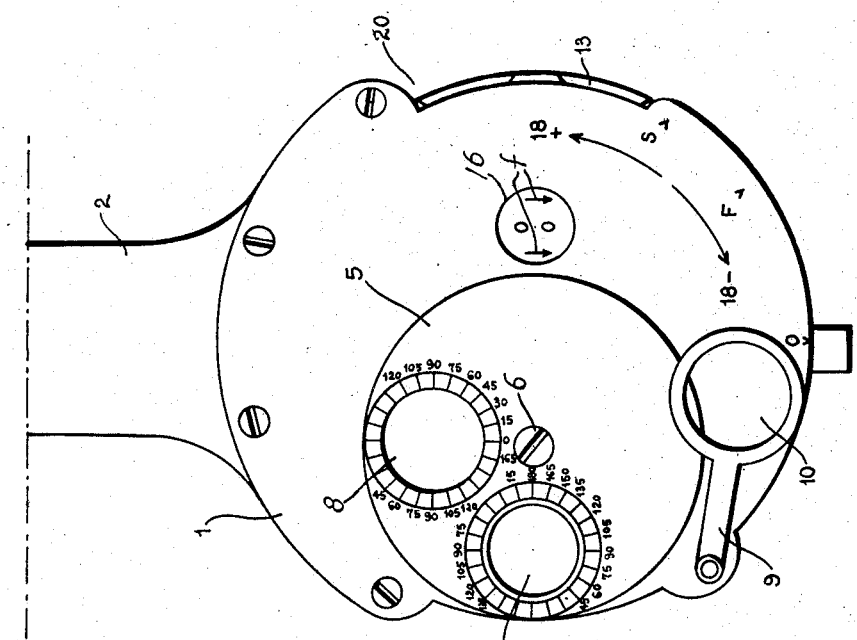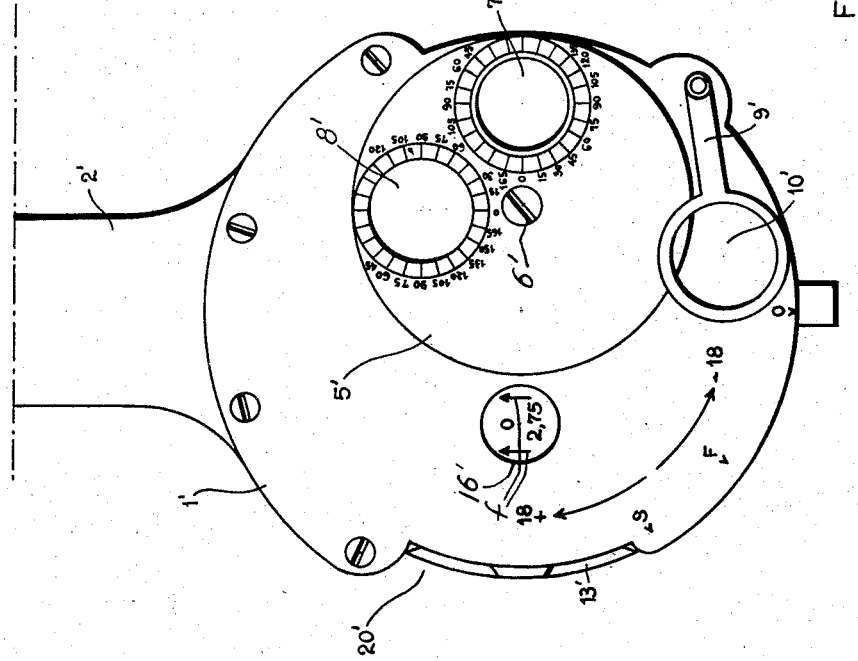
FIG. 1

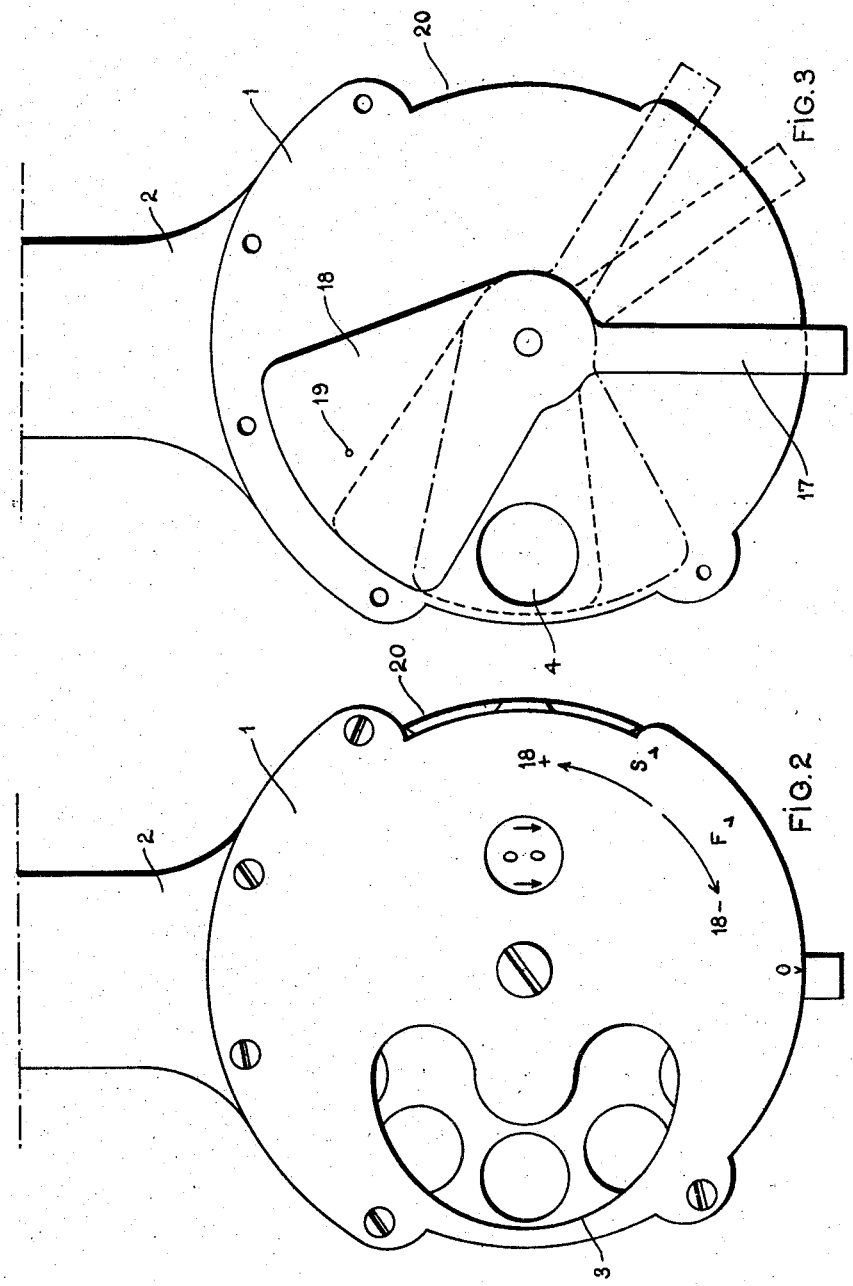

2,888,856

OPHTHALMOLOGICAL INSTRUMENT FOR THE EXAMINATION OF THE EYESIGHT

Pierre André Marly, Melun, France

Application January 2, 1957, Serial No. 632,082

Claims priority, application France January 13, 1956

2 Claims. (Cl. 88—22)

The present invention relates to an ophthalmological instrument of the type known as optometer and is intended for the examination of the eye sight and the determination of the kind and of the power of the corrective optical lenses required. It is well known that, for this examination, the oculists and opticians use, the very old box of tests containing series of corrective lenses which the operator places in succession in a suitable metallic spectacles frame worn by the patient, the chief drawback being that some time elapses between the test of two successive lenses having different powers or characteristics, so that the comparison and the selection between the two lenses become difficult for the patient. The handling of the lenses to place them in the frame and to take them out to replace them in the box are in addition long and tedious, resulting in a non-negligible loss of time and an additional fatigue for the patient and the oculist. To overcome these difficulties, improved apparatus, called refractometers or optometers, have already been designed for a long time; they are constituted by two flat cylindrical casings mounted side by side upon a stand with an adjustable horizontal spacing, both casings being provided, near their adjacent edges, with a sight opening corresponding to an eye of the patient. These two casings contain several superposed rotating disks in which are mounted circular rows of corrective lenses of different positive and negative powers; these lenses can be brought in succession opposite said sight openings and the disks are interconnected by a rather complicated device which allows, by the actuation of only one of said disks, to bring in succession in front of the sight opening combinations of lenses the power of which varies each time by a quarter dioptre, from a negative minimum value to a positive maximum value. In addition a supplementary disk, supporting cylindrical lenses, includes between the frames of these lenses a connection arranged so that the angular setting of the axes of all the cylindrical lenses is carried out simultaneously by the actuation of a single control knob. These apparatus work in a very satisfactory way and are very serviceable but the drawback is that they are very costly and cannot be purchased by the average oculist.

The object of the present invention is to supply an apparatus which offers, in relation to the box of tests, the same advantages as the improved refractometer above mentioned but can be manufactured, for a much lower price. This apparatus is characterized in that, for the determination of the spherical correction, each case contains a first disk, called the main disk, in the apertures of which are mounted, on a half-circle positive lenses and on the outer half-circle negative lenses, the power of the successive lenses varying regularly from a lens to the next at a rate comprised between 2.5 and 3 dioptres, the disposition being such that, by rotating the disk in the same direction, all the range of the powers can be obtained from the negative minimum to the positive maximum, for instance from —12.5 to +10 or —18 to +15; and a second disk, called the auxiliary disk, having the same number of apertures as the main disk and in which are mounted positive lenses with powers differing regularly by 0.25 dioptre, for instance from 0 to 2.25 or from 0 to 2.75 so that the power of the most powerful lens is 0.25 dioptre smaller than the difference between the powers of two consecutive lenses of the main disk, means being provided to rotate these disks either individually or together, every time that the lens of the second disk having the greatest power appears in front of the sight opening.

If, for example, the most powerful negative lens is in front of the sight opening (for instance a —18 dioptres lens in the case of a main disk equipped with lenses varying at the rate of 3 dioptres), by rotating the auxiliary disk supporting positive lenses varying at the rate of 0.25 dioptre from 0 up to 2.75 dioptres, the last position of said auxiliary disk supplies a correction of (—18+2.75)=15.25 dioptres.

At that moment, both disks are simultaneously rotated by one step and in front of the sight opening are brought the lens of the main disk having a power of —15 dioptres and the neutral glass of the auxiliary disk. By continuing in the same manner and rotating by a notch both disks each time the auxiliary disk has rotated a complete turn, the entire range of the corrections is successively tried when turning in the same direction, for instance from —18 to +17.75 dioptres if the power of the most powerful positive lens is 15 dioptres.

To try the range of the corrections in decreasing the power, the operation is exactly the same, but the auxiliary disk and thereby the main disk are to be rotated in the reverse direction.

By way of example, a form of embodiment of the apparatus according to the invention is described hereafter and illustrated in the annexed drawing.

Figure 1 illustrates in front view the assembly of the two casings constituting the apparatus.

Figure 2 is a front view of one of the casings, the disk supporting the cylindrical lenses being removed.

Figure 3 is a rear view of one of the casings.

Figure 5:
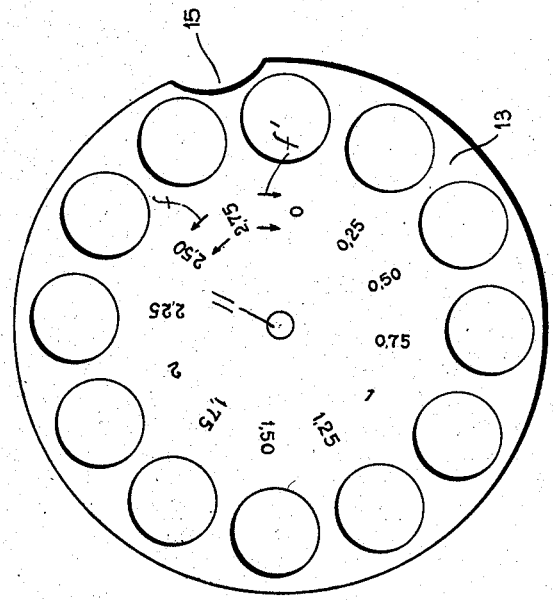
Figures 4 and 5 illustrate the main disk and the auxiliary disk, respectively.

As illustrated in the drawing, the refractometer according to the invention includes in a known way two flat cylindrical casings 1, 1', made of metal or of plastics, respectively connected by two arms, 2, 2', to a holder, not shown, which includes known means to adjust the spacing of the two casings and adjust it according to the distance between the axes of the eyes of the patient. Each casing includes on its front face, near its inner edge, an opening 3, in the shape of a half-circular segment, which port is described hereafter and, on its rear face (near the patient) a circular opening 4 to be placed in front of the corresponding eye of the patient. An outer disk 5 mounted upon the front face of each case is rotatable round an axis 6 and is provided with two apertures 7, 8 which can, in turn, be brought in front of the opening 4 in the rear face of the casing. These apertures bear angular graduations upon their edges and can receive mountings equipped with cylindrical corrective lenses, the axes of which are marked upon the mountings to place the cylindrical lenses with an angular setting of their axes corresponding to the setting which will be determined by another way for the required correction. While one of the lenses is in position in front of the eye of the patient, the oculist introduces another lens in the other aperture so that it is always possible to choose between two corrections, a correction taking the place of the other without any intermediate stage. The opening 3 in the shape of a semi-circular segment in the outer face of the casing allows, on the one hand, the mountings to be introduced so as to bring their lenses closer to the sight opening 4 in the other face and, on the other hand, forms at its ends abutments for the outer disk 5.

In addition, supports 9, 9' are pivoted on the front faces of the casings 1, 1' and bear frames which can receive prisms 10, 10' capable of being brought in front of the sight openings for the determination of the squint correction, or any other accessories such as Maddox cylinders, etc.

Figure 4:
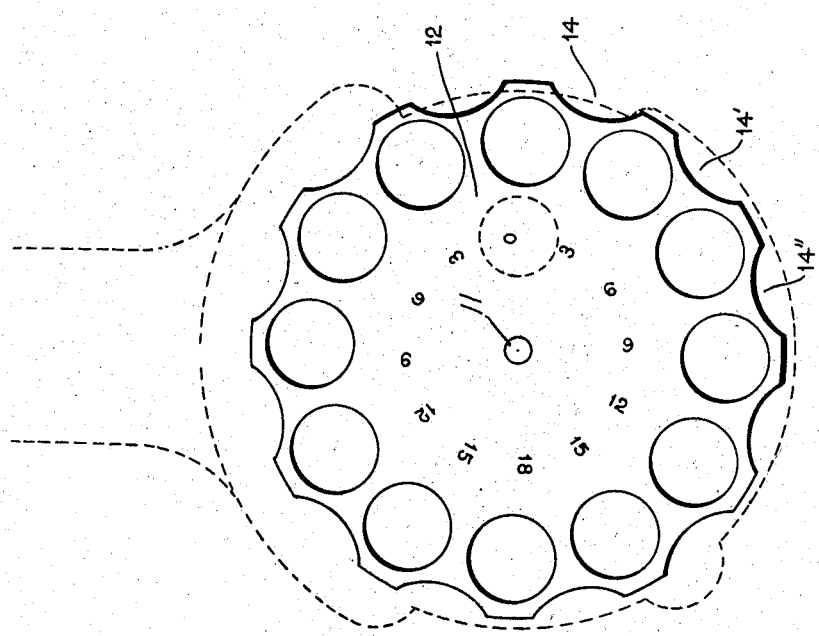

Two susperposed disks 12, 13 (Figs. 4, 5) are mounted on a same central axis 11 inside each casing; these disks, preferably made of transparent plastic material, of acrylic resin for instance, can rotate upon said axis independently of each other. The use of disks made of plastic material greatly facilitates the mounting of the lenses which may be simply placed in the circular openings provided in the disks and may be furthermore glued to the inner edge of said circular openings. The disk 12, the nearest to the rear face of the case, is the main disk upon which are mounted spherical corrective lenses the power of which varies at a rate of 3 dioptres, and covering a range from −18 to +15 or of 2.5 dioptres covering a range from −12.5 to +10, a neutral glass being provided between −3 and +3 or between −2.5 and +2.5. The edge of this disk projecting beyond the case 1 in a cut 20, 20' (Figs. 1 and 2) bears notches 14, 14' . . . (the number of these notches being the same as the number of lenses) allowing, as explained hereafter, intermittent rotation of this disk with the auxiliary disk in an almost automatic way. Ratchet mechanisms, not shown, assist in stopping of the disk in successive positions in which a lens of the disk is exactly in front of the sight opening 4 in the rear face of the casing.

The front disk 13, constituting the auxiliary disk, bears as many lenses as the main disk, varying at a rate of 0.25 dioptre, from 0 up to +2.75 if the lenses of the main disk differ in steps of 3 dioptres and from 0 up to 2.25 if the lenses of the main disk vary by 2.5 dioptres, these two combinations seeming to be the only useful. If the rate of power variation of the consecutive lenses of the main disk be 2 dioptres, both the main and auxiliary disks would have eight lenses (due to the fact that the power of the lenses of the auxiliary disks vary in any case at a rate of 0.25 dioptre) so that the maximum, negative or positive power would be of 10 and 9, 75 dioptres respectively which value is insufficient, whereas a power variation at a rate of 4 dioptres would lead to disks having each 17 openings resulting in excessive and quite useless maximum negative or positive powers of about 36 dioptres. The auxiliary disk 13 is provided with only one notch 15 which appears in the cut 20, 20' when the lens having the maximum power (+2.75 or +2.25) is in front of the sight opening; if, at that moment, it is wished to increase the power of the positive or negative correction, the two disks 12, 13 are rotated together, as above explained, by introducing the finger at the same time in the notch 15 of the auxiliary disk and the notch 14 of the main disk which coincides at that moment with the notch 15. The width of the cuts 20, 20' is sufficiently small to allow the simultaneous appearance, at the utmost, of two successive notches, so as to permit the simultaneous rotation of the two disks only in the above mentioned conditions, that is to say when the auxiliary disk has turned over a complete turn.

The two transparent disks bear, opposite the lenses, figures corresponding to the power of these lenses, the figures of the two disks at the same time appearing transparently in a sight hole 16 on the front face of each casing; as the positive figures are for instance engraved in black and the negative figures engraved in red, it suffices to add or to subtract the two figures appearing in the sight hole. On both sides of the figure of the auxiliary disk which corresponds to the lens of this disk having the maximum power (+2.75 in the illustrated example) are engraved two pairs of arrows: an arrow $f$, directed upwardly and colored in black, corresponds to the direction of rotation in which the powers of the lenses increase and the arrows $f'$, directed downwardly and colored in red, correspond to the direction of rotation in which the powers decrease.

Finally, a lever 17 is pivoted round the axis 11 upon the rear face of the casing and bears a shutter 18, allowing either to leave opened the sight opening 4, or to shut it entirely, or again to bring opposite this opening a stenopaeic hole 19 in the shutter 18, as shown in the positions illustrated respectively in full line, dashed line and dot-and-dashes, in Figure 3.

What I claim is:

1. In an ophthalmological instrument of the type known as optometer for the examination of the eye-sight including a stand, two flat cylindrical casings mounted side by side on said stand, provided with means to adjust their spacing and each provided in its front face with a sight opening corresponding to an eye of the patient, means for the determination of the spherical correction including in each of said casings a rotatable disk, called the main disk, provided with a circular row of apertures disposed so as to travel in front of said opening in the casing, positive spherical lenses mounted in these apertures arranged on a half-circle, negative lenses mounted in the apertures of the other half-circle, the power of the successive lenses varying regularly at a rate comprised between 2.5 and 3 dioptres, the disposition being such that all the range of the powers, from the negative minimum to the positive maximum, is obtained in the sight opening of the casing by rotating the disk in the same direction, and a second disk, called the auxiliary disk, independently rotatable round the same axis as the main disk and provided with a circular row of apertures, the number of which is equal to that of the apertures of the main disk and which are adapted to register therewith, positive spherical lenses varying at a rate 0.25 dioptre mounted in the apertures of said second disk, the power of the most powerful lens being 0.25 dioptre smaller than the difference between the powers of two successive lenses of the main disk, means to rotate the two disks on the one hand separately and on the other hand together over the angular distance between two successive apertures each time the most powerful lens of the auxiliary disk appears in front of the sight opening of the casing, said means comprising a lateral opening provided on the edge of each casing and through which the edges of the two rotating disks project outwardly, the edge of the main disk being provided with segment shaped notches equal in number of the number of lenses of said disk, whereas the auxiliary disk is provided with one single segment shaped notch opposite its lens having the maximum power, the angular width of the opening in the casing being such that at most two notches of the main disk can simultaneously appear in said opening.

2. In an ophthalmological instrument of the type known as optometer for the examination of the eye-sight including a stand, two flat cylindrical casings mounted side by side on said stand, provided with means to adjust their spacing and each provided in its front face with a sight opening corresponding to an eye of the patient, means for the determination of the spherical correction comprising in each of said casings a rotatable disk, called the main disk, made of transparent plastic material, provided with a circular row of apertures disposed so as to travel in front of said sight opening of the casing, positive spherical lenses set and glued in these apertures arranged on a half-circle, negative lenses set and glued in the apertures of the other half-circle, the power of successive lenses varying regularly at a rate of 3 dioptres from +3 to +15 and from −3 to −18, the aperture located between the +3 lens and the −3 lens being provided with an ordinary glass, a second disk called the auxiliary disk, made of plastic transparent material independently rotatable round the same axis as the main disk and comprising a circular row of apertures equal in number to that of the apertures of the main disk and adapted to register therewith, positive lenses varying at a rate of 0.25 dioptre set and glued in the apertures of the auxiliary disk, the power of the most powerful lens being of 2.75 dioptres and one of the apertures being provided with an ordinary glass, means to rotate the two disks on the one hand separately and on the other hand together over the angular distance between two successive apertures each time the most powerful lens of the auxiliary disk appears in front of the sight opening of the casing, said means comprising a lateral opening provided on the edge of each casing and through which the edges of the two rotating disks project outwardly, the edge of the main disk being provided with segment shaped notches equal in number to the number of lenses of said disk, whereas the auxiliary disk is provided with one single segment shaped notch opposite its lens having the maximum power, the angular width of the opening in the casing being such that at most two notches of the main disk can simultaneously appear in said opening.

References Cited in the file of this patent

UNITED STATES PATENTS

| Number | Name | Date |
|---|---|---|
| 563,717 | Knauer | July 7, 1896 |
| 591,617 | Brayton | Oct. 12, 1897 |
| 1,483,786 | De Zeng | Feb. 12, 1924 |
| 1,611,167 | De Zeng | Dec. 21, 1926 |
| 1,945,940 | Hunsicker | Feb. 6, 1934 |
| 2,370,514 | Arnesen | Feb. 27, 1945 |